June 23, 1964 W. B. HATCH 3,138,133
AUTOMATIC PILOT SYSTEM FOR SMALL BOATS
Filed Aug. 3, 1961 2 Sheets-Sheet 1
FIG. 1.
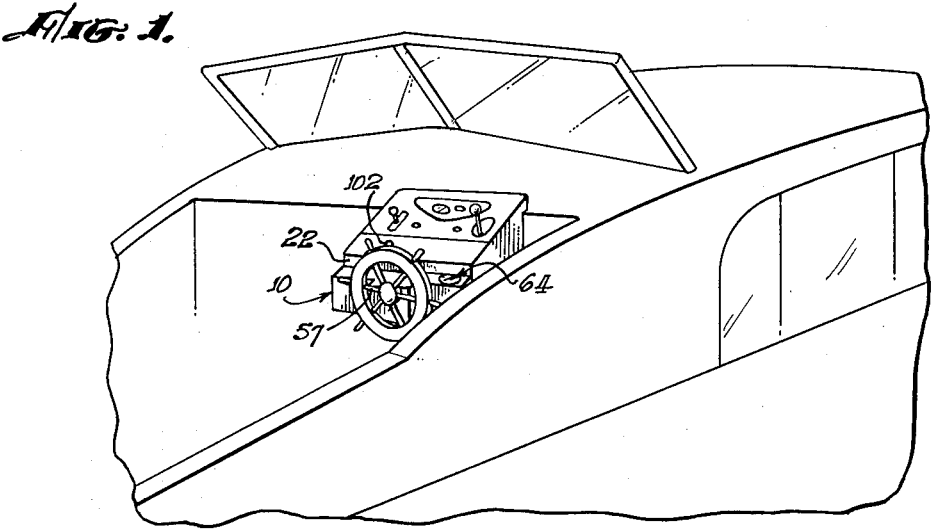
FIG. 2.
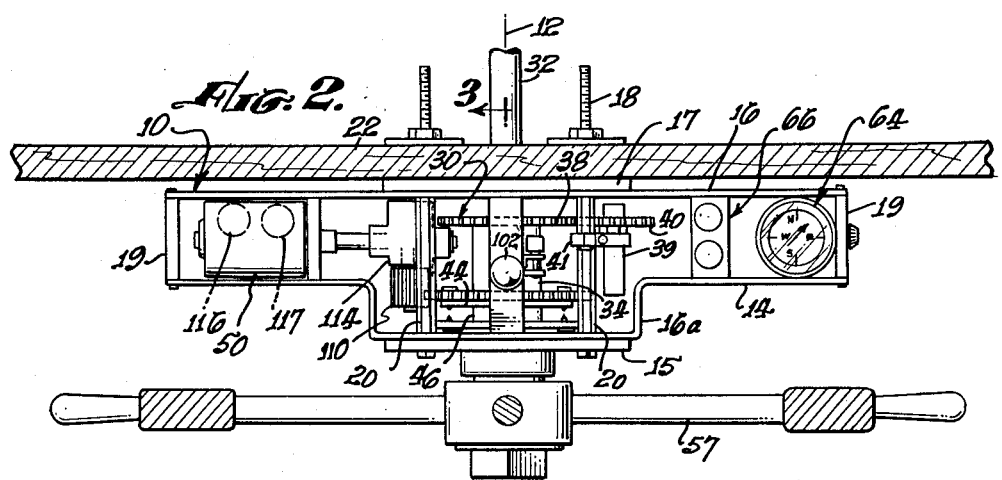
FIG. 4.
FIG. 8.
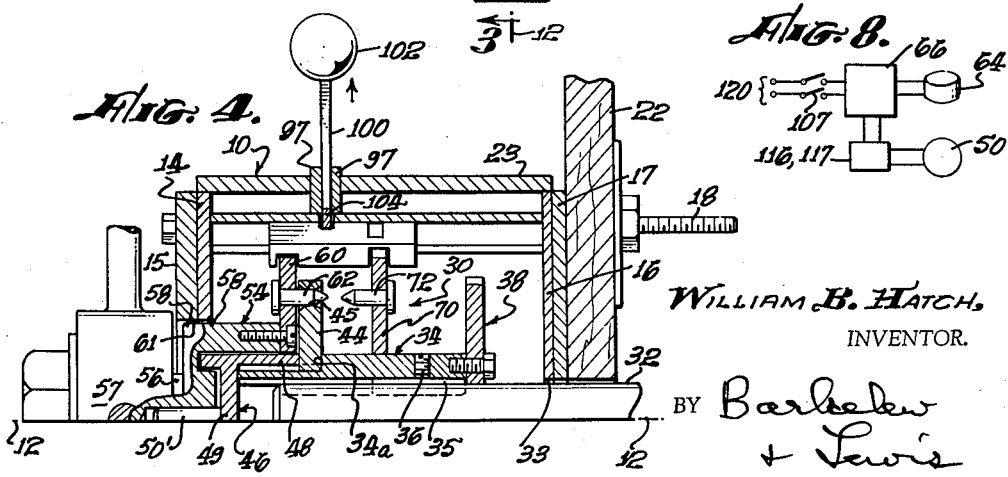
WILLIAM B. HATCH,
INVENTOR.
BY Barbeku
+ Lewis

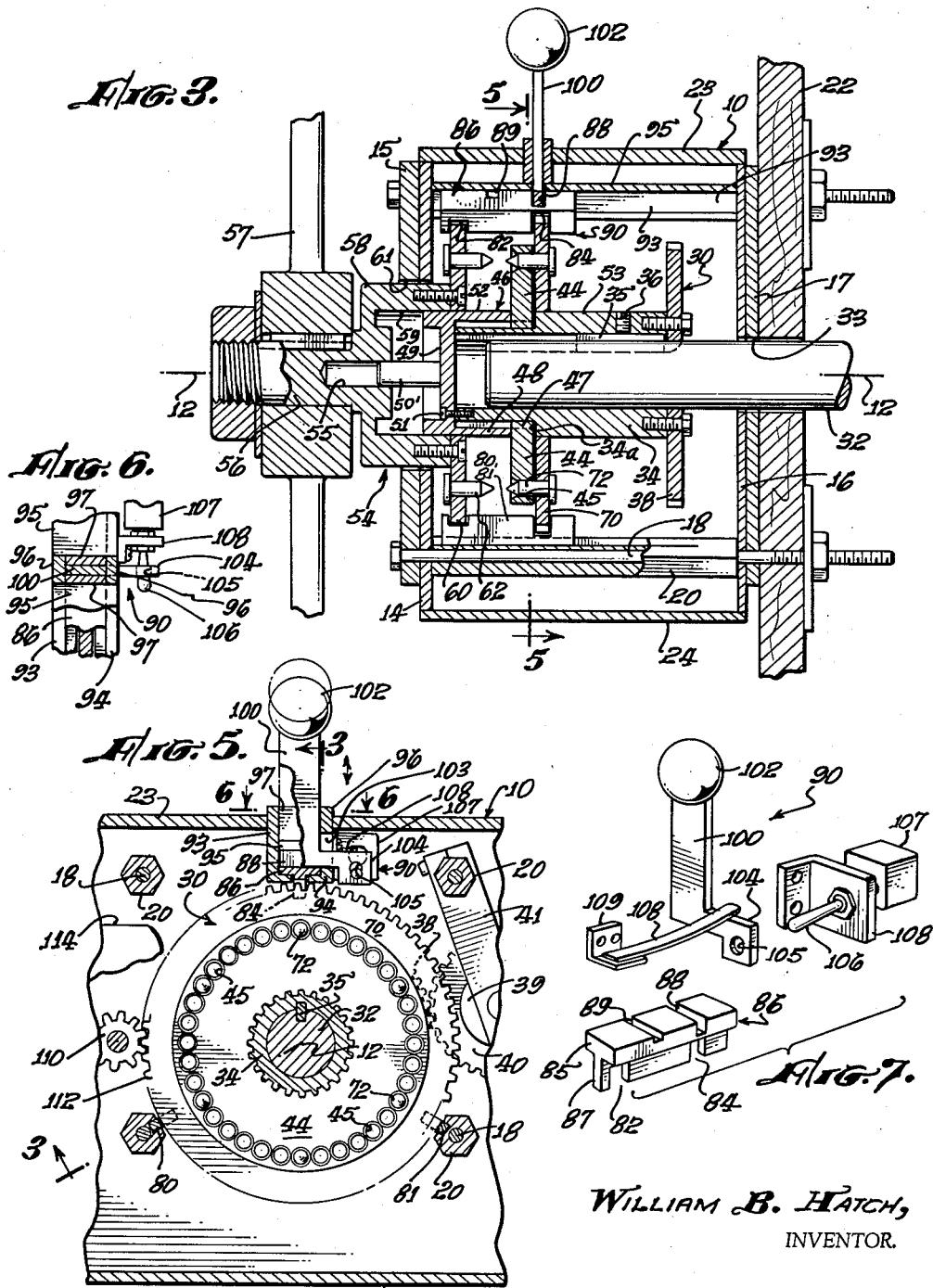

A patent document for an automatic pilot system for small boats. It is a typical patent page.

United States Patent Office 3,138,133
Patented June 23, 1964

3,138,133
AUTOMATIC PILOT SYSTEM FOR SMALL BOATS
William B. Hatch, Santa Barbara, Calif., assignor, by mesne assignments, to Swedlow Inc., Los Angeles, Calif., a corporation of California
Filed Aug. 3, 1961, Ser. No. 128,994
6 Claims. (Cl. 114—144)

This invention has to do with automatic pilot systems for vehicles such as aircraft, small boats and the like, whereby the vehicle may be held automatically on a pre-selected course.

The present invention is concerned more particularly with providing a compact and convenient mechanism, which may be entirely integral in construction, and which may be installed economically. For definiteness, but without implying any limitation upon the scope of the invention, it will be described primarily with relation to boats.

Previously available automatic pilot mechanisms required separate installation of several distinct sub-assemblies at different positions on the boat, with interconnecting control cables. Not only was such procedure inherently complex and expensive, but it was often difficult to find space in an existing boat for installing some of the sub-assemblies where they would operate satisfactorily and be reasonably accessible. The present invention avoids all of those difficulties by constructing essentially the entire mechanism as a single assembly that can be installed readily as a unit.

Moreover, that assembly is preferably so designed and constructed that it can be installed in the position of the regular hand steering wheel, where it is connected to the regular steering shaft of the vehicle. The steering wheel is then remounted on the autopilot mechanism, displaced only slightly from its normal position. With that novel arrangement the intricate mechanism behind the control panel of the vehicle is not disturbed, and no reconstruction or rearrangement of enclosed machinery is required. Moreover, the autopilot mechanism itself is conveniently accessible for servicing or adjustment.

It is already well recognized that it is necessary to disengage the gearing between the steering or helm shaft and the power steering mechanism when the autopilot is not in use. Otherwise it is virtually impossible to manually overcome the torque resulting from the gear train which links the steering motor to the helm shaft. When such disengagement is accomplished by a manual clutch, the operator is burdened with an additional operation to perform when putting the autopilot either into or out of operation. If an automatic electromagnetic clutch is provided, appreciable power must be supplied to the clutch solenoid to keep it engaged during the entire time that the autopilot is in operation.

Many previous systems had the further serious disadvantage that operation of the autopilot caused the manual steering wheel to rotate during every drive action of the autopilot. The wheel represents a rather large inertial load to the control actuator, requiring additional power of the actuator. Moreover, since a good control system requires fast turning of the wheel, intermittent power drive of the steering wheel can seriously injure anyone who inadvertently comes in contact with it. That danger is sometimes avoided in previous systems by providing a special clutch by which the steering wheel may be disconnected. But whether such an additional clutch is operated manually or automatically, it has involved additional expense and labor of installation, and has either consumed additional power, if automatic, or entailed an additional item to be manipulated by the operator. In the latter instance the time required to reestablish manual control of the helm in emergencies could well be critical.

The present invention avoids all such difficulties and disadvantages of previous systems by providing a dual clutch unit which controls simultaneously both clutching operations mentioned above. That clutching action is manually controlled, requiring no electrical power consumption.

Moreover, in preferred form of the present system, the clutching operation is carried out by movement of the steering wheel itself. Movement of the steering wheel axially in one direction typically shifts the system to automatic control; while movement axially in the other direction returns the system to manual control. The system is automatically locked in each condition, and may be released from that condition whenever desired by manual actuation of a single release handle. The release handle is lifted, for example, to release the system from whichever condition it is in; and automatically drops back as soon as the system has been shifted to the other condition, securely locking it in that new condition. The entire clutching operation is thus handled virtually without requiring the operator to become familiar with any new controls.

In accordance with a further aspect of the invention power is supplied automatically to the automatic pilot mechanism whenever the clutching mechanism is shifted to autopilot condition; and power is automatically turned off when the system is in manual condition. That feature relieves the operator of a further extra operation that is required in previous systems, and insures that power will be turned off whenever it is not required. The invention further provides means for preventing operation of the automatic pilot drive motor until the latter is fully coupled to the helm shaft.

In preferred form of the invention, the dual clutching action already indicated is accomplished by a clutch mechanism of novel type, wherein one clutch element carries a circumferentially distributed plurality of axially directed pins and the other element is provided with axial holes adapted to receive the pins. The interengageable pins and holes are so constructed and arranged that the clutch can be engaged by direct axial movement of its elements in substantially any initial rotational position of the same. An important advantage of the described type of clutch is that virtually no continuing axial force is required to maintain its positive engagement.

A full understanding of the invention, and of its further objects and advantages, will be had from the following description of an illustrative manner in which it can be carried out. The particulars of that description, of which the accompanying drawings form a part, are intended only as illustration, and not as a limitation upon the scope of the invention, which is defined in the appended claims.

In the drawings:

FIG. 1 is a perspective representing typical installation of the invention in a vehicle, shown illustratively as a boat;

FIG. 2 is a plan, representing an illustrative embodiment of the invention with the top cover plate removed;

FIG. 3 is a generally vertical axial section at enlarged scale on the lines 3—3 of FIGS. 2 and 5, and showing the mechanism in autopilot position, as in FIG. 2;

FIG. 4 is a half-section corresponding generally to FIG. 3, but showing the mechanism in manual position;

FIG. 5 is a transverse fragmentary section on the line 5—5 of FIG. 3;

FIG. 6 is a detail horizontal section on the line 6—6 of FIG. 5;

FIG. 7 is an exploded schematic perspective of certain parts associated with typical control handle mechanism; and FIG. 8 is a schematic circuit diagram.

The particular embodiment of the invention that will be described for purposes of illustration comprises a unitary housing structure, indicated generally by the numeral 10. Housing 10 extends horizontally substantially symmetrically on both sides of the main axis 12, which is the axis of the helm shaft of the boat. The housing typically comprises generally parallel front and back walls 14 and 16, which are fixedly held in mutually spaced relation by the bolts 18 and spacing posts 20, and by the end walls 19. The central portion of front wall 16 is offset at 16a to provide additional space within the housing adjacent axis 12, while maintaining ample clearance adjacent the periphery of the steering wheel 57. Additional stiffness may be provided by the generally circular front and back plates 15 and 17. Bolts 18 typically extend back of wall 16, and of back plate 17, if used, and provide convenient means for mounting the entire unit on the control panel of a boat, indicated schematically at 22. Removable top and bottom cover plates 23 and 24 complete the housing and provide rapid and convenient access to the apparatus within the housing.

The central portion of housing 10 contains the clutch and drive mechanism, designated generally by the numeral 30. One of the side arms of the housing, shown as the left arm in FIG. 1, accommodates the steering actuator 50, which is typically a conventional reversible electric motor, and any electromagnetic control gear for the actuator. The other housing arm accommodates the compass 64 and the non-magnetic portions of the control circuits for actuator 50, indicated generally by the numeral 66. The compass and electrical control system may be of conventional construction and do not require detailed description.

Housing 10 is fixedly mounted on the control panel 22 with the regular helm shaft 32 of the boat or other vehicle extending through the clearance aperture 33 in the rear wall of the housing along axis 12. The mounting sleeve 34 is fixedly mounted on helm shaft 32, as by the key 35 which is secured by the setscrew 36. At its rearward end, sleeve 34 carries coupling means, shown as the gear 38, for driving a rudder position transducer of any desired type, indicated schematically at 39 in FIGS. 2 and 5. That transducer may, for example, comprise a rotary potentiometer which produces a signal voltage corresponding in magnitude to the rudder position and adapted for driving a visual position indicator of known type. Transducer 39 and its drive gear 40 are typically mounted by means of the bracket 41 in axially adjustable position on one of the spacing posts 20.

The central clutch member 44, comprising an annular disk, is fixedly mounted on helm shaft 32 by means of mounting sleeve 34. The forward end of that sleeve is reduced in diameter, forming the axially facing shoulder 34a. Clutch member 44 slips over the reduced portion of the mounting sleeve and is clamped against shoulder 34a by the retainer 46. Retainer 46 is fixedly mounted on sleeve 34 by the screws 51. Rotation of the clutch member on sleeve 34 is prevented by mating spline formations 47, typically of the form of gear teeth.

Retainer 46 comprises a sleeve portion 48, which fits telescopically over the reduced end portion of mounting sleeve 34 and abuts clutch plate 44; and a web portion 49 which fixedly carries the axial pin 50'. The outer surface 52 of retainer sleeve portion 48 and the surface of pin 50' provide coaxial cylindrical guide surfaces for the wheel assembly 54. The outer surface 53 of mounting sleeve 34 provides a cylindrical guide surface for power clutch member 70.

Wheel assembly 54 comprises the hollow hub 58 and the wheel shaft 56, adapted to receive the manual steering wheel 57. A clearance aperture 61 for hub 58 is provided in housing wall 16. The inner cylindrical surface 59 of hub 58 fits telescopically over guide surface 52 of retainer 46. Shaft 56 is provided with an axial bore 55, which telescopically receives guide pin 50'. Wheel assembly 54 is thus mounted on helm shaft 32 for relative rotary and axial movements. Hub 58 fixedly carries the manual clutch member 60. The axial movement is limited inwardly by engagement of manual clutch member 60 and clutch plate 44, as in FIG. 4. Outward movement of wheel assembly 54 is limited by engagement of power clutch member 70 and clutch plate 44, as in FIGS. 2 and 3.

Power clutch member 70 and manual clutch member 60 are coupled together with respect to their axial movement by any suitable coupling mechanism that permits their free relative rotation. In the present embodiment of the invention that coupling mechanism comprises a plurality of spacers 80, 81 and 86, each of which is slotted at 82 and 84 to freely receive the peripheries of the respective clutch members, and which are freely slidable axially in suitable guide means. The guide means for the two lower spacers 80 and 81 are typically formed integrally on spacing posts 20 of the housing structure, as shown best in FIGS. 3 and 5. Upper spacer 86 is carried by guide structure which is part of the detent and switch mechanism indicated generally by the numeral 90, more fully described below. The axial movement of spacers 80, 81 and 86 is determined by that of manual clutch member 60, subject to the limitations imposed by detent mechanism 90, to be described, and causes clutch member 70 to maintain a fixed axial spacing with respect to member 60. Those two clutch members are thus movable axially essentially as a unit in response to manual movement of steering wheel 57. However, rotation of the clutch members relative to each other and relative to the housing is not limited by the spacers. Clutching formations are provided on the three clutch members 44, 60 and 70 such that helm clutch plate 44 is positively locked rotationally to one or other of members 60 and 70, according to the axial position of the latter.

In accordance with an important feature of the invention, those clutching formations are of such a type that when they are engaged in either operating position of the clutch they do not exert any axial forces upon the clutch members. Moreover, the clutching formations are preferably so formed that the clutch may be brought into engagement by direct axial movement of the coupled pair of clutch members 60 and 70, without requiring any hunting by the operator to find a rotary position in which engagement is possible. Those advantages are typically provided by forming the clutch in the manner illustrated. Clutch member 44 carries clutching formations in the form of a circle of axially directed holes 45 at uniform radius from axis 12 and at uniform, relatively close, angular spacing. The holes are preferably counter sunk on both faces of the clutch disk to a sufficient depth that the conical portions of adjacent holes overlap slightly, as shown in FIG. 5. Clutch members 60 and 70 comprise flat annular discs and carry clutching formations in the form of pins 62 and 72, respectively, projecting from their opposed faces toward member 44 and in alignment with respective holes 45 of the latter member. The ends of the pins are essentially conical to facilitate entrance into holes 45, but have cylindrical shanks which engage the walls of the holes when fully inserted. The number of pins in each of the clutch members 60 and 70 is typically considerably less than the number of holes 45, being shown illustratively as one sixth of that number, but is made fully sufficient to transmit the rquired torque to clutch member 44 under the most severe conditions that might be encountered.

Actuator 50 is drivingly coupled to clutch drive member 70 in any suitable manner that permits the described axial movement of the latter. As illustratively shown, a drive pinion 110 engages gear teeth 112 cut directly in the periphery of clutch member 70 (FIG. 5). Pinion 110 is sufficiently long axially to engage the teeth on clutch member 70 in all axial positions of the latter. Pinion 110 is driven from actuator 50 via a speed reduction gear indicated at 114 in FIG. 2, typically comprising a worm and worm gear of conventional construction. Actuator 50 is typically controlled independently for right and left drive by respective power relays, indicated at 116 and 117 in FIG. 2, which are mounted closely adjacent the actuator and at maximum distance from compass 64 to avoid compass errors due to stray magnetic fields. The relays are controlled, in turn, by electronic circuits 66, typically including transistors, which are responsive to error signals developed by compass 64. Many different types of compass structure providing course error signals and amplifying circuits responsive to such signals for controlling power relays are well known, and do not require detailed description here.

Detent and switch mechanism 90 comprises structure forming a guide channel for spacer 86, already described, guide means transverse of that channel for detent 100, and switch actuating mechanism coupled with detent 100. Spacer 86 comprises a body portion 85 of rectangular section and a downwardly extending tongue 87 (FIG. 7). The body portion of spacer 86 slides in a channel formed by the two rails of L-section 93 and 94 and the cover 95 (FIGS. 5 and 6). The tongue of spacer 86 projects downwardly between the rails and is slotted at 82 and 84 to receive clutch members 60 and 70, respectively, as already described.

Detent 100 comprises a vertically elongated handle with operating knob 102 and side arm 104, and is mounted for substantially free vertical movement in a guideway formed by the vertical projections 96 of rails 93 and 94 and by the side plates 97 (FIG. 6). The upper face of the spacer body portion 85 is provided with two detent recesses 88 and 89 adapted to receive the lower end of detent 100. As shown, those recesses and the detent end are of rectangular section, so that the detent action is positive. Insertion of the detent in either recess definitely locks the spacer in the corresponding position in its guideway, and thereby positively locks the axial position of clutch elements 60 and 70.

Detent 100 carries an integral side arm 104 for operating an electrical switch. Arm 104 projects through a clearance slot 103 in guide rail 94, the upper end of slot 103 limiting upward movement of detent 100 (FIG. 5). As shown, a hole 105 in the arm freely receives the operating lever 106 of the switch 107. Switch 107 is fixedly mounted by the bracket 108 on rail 94 in such position that when detent 100 is fully inserted in recess 88 the switch is closed, whereas when the detent is raised to permit movement of spacer 86, or when the detent is fully inserted in recess 89, which is appreciably shallower than 88, the switch is open. Switch 107 is typically of conventional spring-loaded, momentary, normally on, type. The spring action of the switch may then be utilized to exert a yielding downward force on detent 100, providing reliable locking action. That spring force may be supplemented or replaced, if preferred, by an auxiliary spring. For example, a leaf spring 108 may be mounted by a bracket 109 on the side wall of guide rail 94 (FIG. 7).

Switch 107 is preferably connected in series between a suitable source of electrical power 120 and the entire automatic control mechanism, as indicated schematically in FIG. 8. Opening of switch 107 then cuts off power for driving actuator 50 and for energization of the compass and circuit mechanism by which that power is automatically controlled. When control circuitry 66 is of a type that requires one or more amplifiers, it is ordinarily desirable to utilize transistors rather than vacuum tubes for amplification, since transistors become fully operative immediately upon energization. If it is preferred to use any elements, such as vacuum tubes, for example, which normally require a warm-up period, power may be provided in parallel with switch 107 for maintaining those elements in standby condition.

In operation of the described auto-pilot device, the operator can shift the mechanism between manual and automatic positions by simply lifting detent 100 to unlock the mechanism from its existing position and then shifting manual steering wheel 57 axially in the desired direction until detent 100 drops, locking the mechanism in its new position. That simple operation actuates the dual clutch mechanism, automatically releasing the helm shaft from one drive control and connecting it to the other. In preferred form of the invention, the same operation operates switch 107, energizing the automatic control mechanism or deleting power from that mechanism, as required, entirely automatically and reliably. When the device is shifted to automatic position there is no possibility of leaving the manual wheel connected, and no possibility of neglecting to supply power to the mechanism. Also, in shifting to manual control power is automatically turned off and, particularly in an emergency, there is no possibility that the operator will forget to release the automatic drive clutch, or to engage the manual drive clutch. The mechanism is entirely safe, since under automatic drive the manual wheel is always released; and the positive locking action of detent 100 insures that accidental pressure against the wheel, whether rotational or axial, cannot shift the mechanism from one position to the other.

I claim:

1. Pilot mechanism adapted for connection to a vehicle steering shaft that projects from a bulkhead and normally carries a manual steering wheel, said mechanism comprising in combination a support having an axis and adapted to be fixedly mounted exclusively on the steering shaft coaxially thereof in place of the manual steering wheel, a wheel carrier mounted exclusively on the support coaxially thereof for rotational and axial movement relative thereto and adapted to fixedly carry the manual steering wheel, a power drive member mounted exclusively on the support coaxially thereof for rotational and axial movement relative thereto, means mutually coupling the wheel carrier and the power drive member with respect to their said axial movements, clutch formations mounted respectively on the support and on the wheel carrier and interengageable in response to said axial movements in one direction, clutch formations mounted respectively on the support and on the power drive member and interengageable in response to said axial movements in the other direction, and selectively energizable power means adapted to be mounted in fixed position on the bulkhead and continuously coupled rotatively to the power drive member.

2. Pilot mechanism adapted for connection to a vehicle steering shaft that projects from a bulkhead and normally carries a manual steering wheel, said mechanism comprising in combination a support sleeve adapted to be fixedly mounted on the steering shaft coaxially thereof in place of the manual steering wheel and having a flange intermediate its length, a wheel carrier coaxially mounted on the sleeve for rotational and axial movement relative thereto outwardly of the flange and adapted to carry the manual steering wheel, a spur gear coaxially mounted on the sleeve for rotational and axial movement relative thereto inwardly of the flange, means mutually coupling the wheel carrier and the spur gear with respect to their said axial movements, clutch formations mounted respectively on the sleeve flange and on the wheel carrier and interengageable in response to inward axial movement of the wheel carrier, clutch formations mounted respectively on the sleeve flange and on the spur gear and interengageable in response to outward axial movement of the wheel carrier, and selectively energizable power means continuously coupled rotatively to the spur gear, said wheel carrier being flanged and said coupling means comprising a plurality of spacing elements, axially extending guide means for the respective spacing elements, said elements being recessed to receive the peripheries of the spur gear and the wheel carrier flange in axially spaced relation.

3. Pilot mechanism as defined in claim 2 and including manually releasable locking means associated with at least one of the spacing elements and acting automatically to lock the same in each of its clutch engaging positions.

4. Pilot mechanism as defined in claim 2 and including locking means movable transversely of a spacing element and spring urged into engagement therewith, the spacing element being recessed to receive the locking means in each of the clutch engaging positions of the element, and means for manually retracting the locking means from the recess to release the same.

5. Pilot mechanism for controlling the steering shaft of a vehicle, comprising in combination means for mounting a manual steering wheel for rotational and axial movement, power drive means actuable automatically in response to variations in the vehicle heading, and clutch means acting to couple the steering shaft selectively to the steering wheel and to the drive means in response to axial movement of the steering wheel in respective directions, said clutch means comprising positively interengageable formations rotatively coupled to the steering shaft and to the steering wheel and drive means, respectively, said formations having leading edges that are so tapered as to permit clutch engagement in response to direct axial thrust on the steering wheel in all rotational positions thereof.

6. Pilot mechanism for controlling the steering shaft of a vehicle, comprising in combination means for mounting a manual steering wheel for rotational movement and for axial movement between two positions, power drive means actuable automatically in response to variations in the vehicle heading, first clutch means actuable to couple the steering shaft to the manual steering wheel in one axial position thereof, second clutch means actuable to couple the steering shaft to the power drive means in the other axial position of the steering wheel, a manually actuable latch member having one locking position for locking the steering wheel in its said one position and having another locking position for locking the steering wheel in its said other position, and means for actuating the power drive means only when the latch member is in its said other position.

References Cited in the file of this patent
UNITED STATES PATENTS

| | | |
|---|---|---|
| 2,326,610 | Hill | Dec. 14, 1943 |
| 2,362,178 | Walker | Nov. 7, 1944 |
| 2,719,502 | West | Oct. 4, 1955 |
| 2,736,856 | Sasaki et al. | Feb. 28, 1956 |